(12) United States Patent
Keller

(10) Patent No.: US 6,502,461 B2
(45) Date of Patent: Jan. 7, 2003

(54) METHOD AND APPARATUS FOR MONITORING LIQUID LEVEL IN A CONTAINER

(76) Inventor: John M. Keller, HC 79, Box 130, Canvas, WV (US) 26662

( * ) Notice: Subject to any disclaimer, the term of this patent is extended or adjusted under 35 U.S.C. 154(b) by 0 days.

(21) Appl. No.: 09/779,330

(22) Filed: Feb. 8, 2001

(65) Prior Publication Data

US 2001/0032506 A1 Oct. 25, 2001

Related U.S. Application Data

(60) Provisional application No. 60/181,015, filed on Feb. 8, 2000.

(51) Int. Cl.$^7$ ............................. G01F 23/00; G01F 23/30
(52) U.S. Cl. .......................... 73/305; 73/290 R; 73/309
(58) Field of Search ............................... 73/290 R, 305, 73/311, 309, 314

(56) References Cited

U.S. PATENT DOCUMENTS

| | | | | |
|---|---|---|---|---|
| 3,703,246 A | * | 11/1972 | Horak | 222/17 |
| 4,552,090 A | * | 11/1985 | Coleman | 116/204 |
| 4,627,283 A | | 12/1986 | Nishida et al. | |
| 4,905,377 A | * | 3/1990 | Martinez et al. | 33/333 |
| 5,752,409 A | * | 5/1998 | Lippmann et al. | 73/290 R |
| 5,920,255 A | * | 7/1999 | Poletto et al. | 340/450.2 |
| 5,950,487 A | * | 9/1999 | Maresca, Jr. et al. | 73/293 |

FOREIGN PATENT DOCUMENTS

| | | |
|---|---|---|
| EP | 0333524 A2 | 9/1989 |
| FR | 70.21274 | 2/1972 |

OTHER PUBLICATIONS

Worthington Cylinder Corporation, L.P.G. Forklift Cylinders/Aluminum, date unknown, 1 page, Worthington Cylinder Corp., P.O. Box 391, Columbus, OH 43085.

* cited by examiner

Primary Examiner—Daniel S. Larkin
Assistant Examiner—Rodney Frank
(74) Attorney, Agent, or Firm—Gardner Groff & Mehrman, P.C.

(57) ABSTRACT

A method and system for remote monitoring of liquid level 21 within a container 12, such as the level of fuel within a propane cylinder. A magnetic float 20 disposed within the container 12 floats on the liquid 21, and lowers with the liquid level as fuel is consumed. Magnetic sensors 22 outside the container 12 sense the float 20 as it passes in the proximity of one of the sensors 22. A controller 26 receives output signals from the sensors 22 and transmits level indicating signals to a gauge 28 or other indicator for remote indication of the corresponding liquid level. The indicator 28 can be located proximal the user's direct line of sight, to remind the user to periodically monitor the fuel level to prevent running out of fuel.

40 Claims, 13 Drawing Sheets

FIG. 4 (FULL)

FIG. 5 (3/4 FULL)

FIG. 6 (1/2 FULL)

FIG. 7 (1/4 FULL)

METHOD AND APPARATUS FOR MONITORING LIQUID LEVEL IN A CONTAINER

CROSS REFERENCE TO RELATED APPLICATIONS

This application claims the priority benefit of U.S. Provisional Patent Application Serial No. 60/181,015, filed Feb. 8, 2000 which is hereby incorporated by reference in its entirety.

TECHNICAL FIELD

The present invention relates generally to fluid level monitoring and, more particularly, to a method and apparatus for remote monitoring of the level of a liquid in a closed container.

BACKGROUND OF THE INVENTION

Liquid level monitoring is important in many applications. For example, the level of fuel in the fuel tank of a vehicle or other device typically is monitored, at least periodically, to allow the user to schedule re-filling, to monitor efficiency, for cost accounting, and/or for a variety of other reasons. Similarly, the level of liquid in storage tanks or mixing tanks of various processes or systems is commonly monitored. Often, the container is closed to prevent external contamination of its contents and/or to prevent loss by spillage or evaporation. In instances wherein the container is closed, and/or if the container is located remotely from the desired monitoring location, it is desirable to provide for remote monitoring of the liquid level. Remote monitoring is often accomplished by provision of a liquid level sensor or probe within the container, and a remote gauge or other indicator at the desired monitoring location. The gauge or other indicator is typically coupled to the level sensor or probe by a mechanical linkage or electrical conductors.

One particular application in which remote monitoring is desirable is in the monitoring of fuel level within a closed liquid propane tank. Propane-powered industrial machinery of various types is in widespread use throughout the world. For example, forklifts and other propane-powered equipment are commonly used in warehouses, factories, production facilities, home stores, etc., for the movement, loading and unloading of equipment and supplies. The use of propane as a fuel for indoor machinery is desirable because of its low carbon monoxide tailpipe emissions.

Furthermore, gasoline engines originally provided on industrial machinery often are converted from gasoline to propane for indoor applications. Many gasoline-powered forklifts are originally provided with a dashboard gauge for monitoring the level of gasoline in the vehicle's fuel tank. When a forklift is converted to propane, this gauge is typically disconnected, and a sticker placed over the gauge indicating the gauge is no longer in operation.

On a typical propane-powered forklift, a replaceable, refillable, fuel cylinder is carried on board by use of a strap-bracket assembly. Aluminum forklift propane cylinders are commercially available from a variety of sources, including Worthington Cylinder Corporation of Columbus, Ohio. Many cylinder manufacturers offer a permanent float-type gauge as part of the cylinder. These gauges include a level float or probe mounted internally of the tank, which is linked to a dial gauge affixed to the top end of the cylinder for viewing. However, because the cylinder is typically mounted behind the operator's seat or otherwise beyond the direct line of sight of the operator during normal use, the operator seldom checks the fuel level in the tank. When the fuel level is not readily viewable, the driver will often forget to periodically check the level and will sometimes allow the engine to run out of fuel. When this happens, a full cylinder must be carried from its storage location to the forklift. Depending on where the machine stopped, this distance may be considerable, resulting in lost time and productivity.

Furthermore, when a cylinder is emptied it is usually replaced with a full cylinder, instead of storing and dispensing liquid propane on site. Because of the frequent exchange of an empty cylinder for a full one, the same cylinder practically never stays on a given piece of machinery. Therefore, the provision of an electrically-coupled or mechanically-linked fuel level monitoring system coupling the float type gauge of the cylinder to a dashboard indicator would be very inconvenient, if not impractical. Wires or linkages connecting the level sensor of the cylinder to the dashboard-mounted gauge would have to be disconnected from the empty cylinder and reconnected to the full cylinder upon each tank change.

Accordingly, it can be seen that there is a need for an improved method and apparatus for monitoring the level of a liquid in a container. A particular need exists for a level monitoring method and apparatus enabling a forklift operator to remotely monitor fuel level within a replaceable propane cylinder. A further need exists for such a method which permits observation of the monitored level at a location in or near the direct line of sight of the operator during normal operation, and which allows replacement of cylinders without the inconvenience of disconnecting and reconnecting the monitoring equipment. It is to the provision of a method and apparatus meeting these and other needs that the present invention is primarily directed.

SUMMARY OF THE INVENTION

Briefly described, the present invention comprises a method and apparatus for remote monitoring of a liquid level in a container. In an exemplary embodiment, the invention comprises a method and apparatus providing dashboard monitoring of liquid level of a DOT/ICC type propane cylinder mounted on a propane-powered machine. The machine can be a forklift or other device with an exchange-type cylinder mounted out of the driver's view. The cylinder may or may not be provided with a liquid level float gauge readable at the cylinder.

The invention comprises the provision of a floating magnet within the propane cylinder and a series of spaced sensors mounted along the bend of the bracket-strap typically provided on the vehicle for anchoring the cylinder. The spacing of the sensors can be selected to generally coincide with proportionately spaced liquid levels of fuel within the cylinder. When the magnet moves into the vicinity of one of the sensors, a signal corresponding to the sensor is sent to a controller which in turn sends an electrical signal to the dash-mounted gauge and illuminates a corresponding level-indicating light or otherwise effects indication of the fuel level.

Considered in one aspect, the present invention is a system for remote monitoring of a level of liquid within a container. The system can include at least one magnetic float provided within the container; at least one sensor mounted to a structure external of and adjacent the container; an indicator remote from the container for indicating at least one level of liquid within the container, each indicated level corresponding to the respective sensor; and a controller or other means for processing and communicating signals from the at least one sensor to the indicator. The sensors can be provided mounted onto a flexible member so that the sensor spacing is preset and the member can be easily installed adjacent the container.

In another aspect, the present invention is an improvement to a vehicle of the type having a removable and replaceable fuel cylinder. The improvement can include a remote fuel level monitoring system including an array of sensors mounted to the vehicle adjacent the fuel cylinder for sensing proximity of a magnetic float disposed within the fuel cylinder; a fuel level indicator remote from the fuel cylinder; and a controller or other means for receiving and processing signals from the array of sensors and transmitting signals to the fuel level indicator, whereby the fuel level indicator provides an indication of the level of fuel within the cylinder, and whereby cylinders can be removed and replaced without disconnecting the remote fuel level monitoring system.

In yet another aspect, the present invention is a method for remote monitoring of a level of liquid within a container. The method can include the steps of providing at least one magnetic float within the container; providing at least one sensor mounted to a structure external of and adjacent the container; providing an indicator remote from the container for indicating at least one level of liquid within the container, each indicated level corresponding to the respective sensor; and processing and communicating signals from the at least one sensor to the indicator, thereby indicating a level of liquid within the container.

In another aspect, the invention is a method for retrofitting a pre-existing liquid level indicator to provide for remote liquid level monitoring. The method includes the steps of providing one or more magnetic proximity sensors; providing at least one controller with resistance characteristics selected to correspond to the resistance characteristics of the pre-existing indicator; connecting the sensors to the controller; and connecting the controller to the pre-existing indicator. The retrofit method can further include the step of providing a liquid container with at least one magnetic float disposed therein.

In still another aspect, the present invention can include a liquid container for use with a remote level monitoring system. The container includes a shell bounding a contained volume, at least one opening through the shell communicating with the contained volume, and a magnetic float disposed within the contained volume.

In a further aspect, the present invention is a magnetic float for use within a container forming a portion of a remote level monitoring system, the float comprising a body buoyant in liquid of the type contained in the container, at least a portion of the float comprising a magnetic material.

These and other objects, features, and advantages of the present invention will become more apparent upon reading the following description in conjunction with the accompanying drawing figures.

BRIEF DESCRIPTION OF THE DRAWING FIGURES

DETAILED DESCRIPTION OF THE EXEMPLARY EMBODIMENTS

Figure 1:
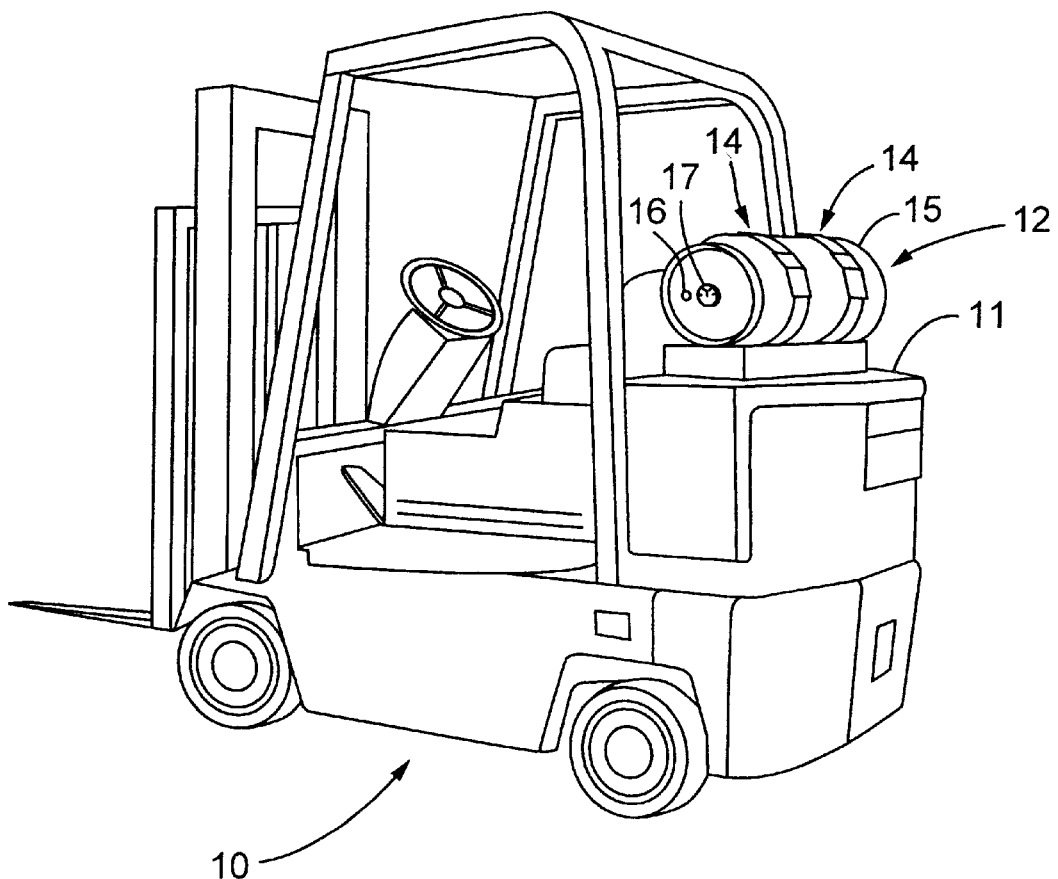
FIG. 1 shows a conventional forklift having a strap-mounted interchangeable propane fuel tank with an integral tank-mounted fuel level gauge.

Referring now to the drawing figures, wherein like reference numerals represent like parts throughout the several views, exemplary embodiments of the present invention will now be described. FIG. 1 shows a conventional forklift 10 and a removable and replaceable container 12 of liquid propane (LP). The forklift 10 has a frame 11 with a mount 14 for removably mounting the container 12 to the forklift frame 11 behind the operator's seat. The container mount 14 is provided by two bracket strap connectors, according to known manner. The container 12 is a conventional cylinder having an outer shell 15 bounding a contained volume for storing liquid contents, at least one valved opening 16 in communication with the Although the invention is described with reference to an embodiment for use with propane-fueled forklifts, the present invention can be configured for use with other types of machinery, containers, and liquids. For example, in addition to forklifts, the invention can be used with other machinery such as powered carts, industrial processing equipment, heating equipment, and so forth, whether fueled by propane or other liquids. Also, the present invention can be applied to all shapes and sizes of liquid containers, including aluminum DOT/ICC cylinders used with propane-powered vehicles, as well as a variety of other containers formed at least in part of non-magnetic materials. Additionally, the invention can be used with containers of other fuel or non-fuel liquids such as gasoline, oil, kerosene, water, and so forth. Furthermore, the invention can be used with container mounts provided by any number of bracket strap connectors, different types of rigid or flexible strap connectors, flanged members, pivot arms, ropes or cables, cradles, and other structures for removably mounting a container in place in a generally horizontal, vertical, or other arrangement.

Figure 2:
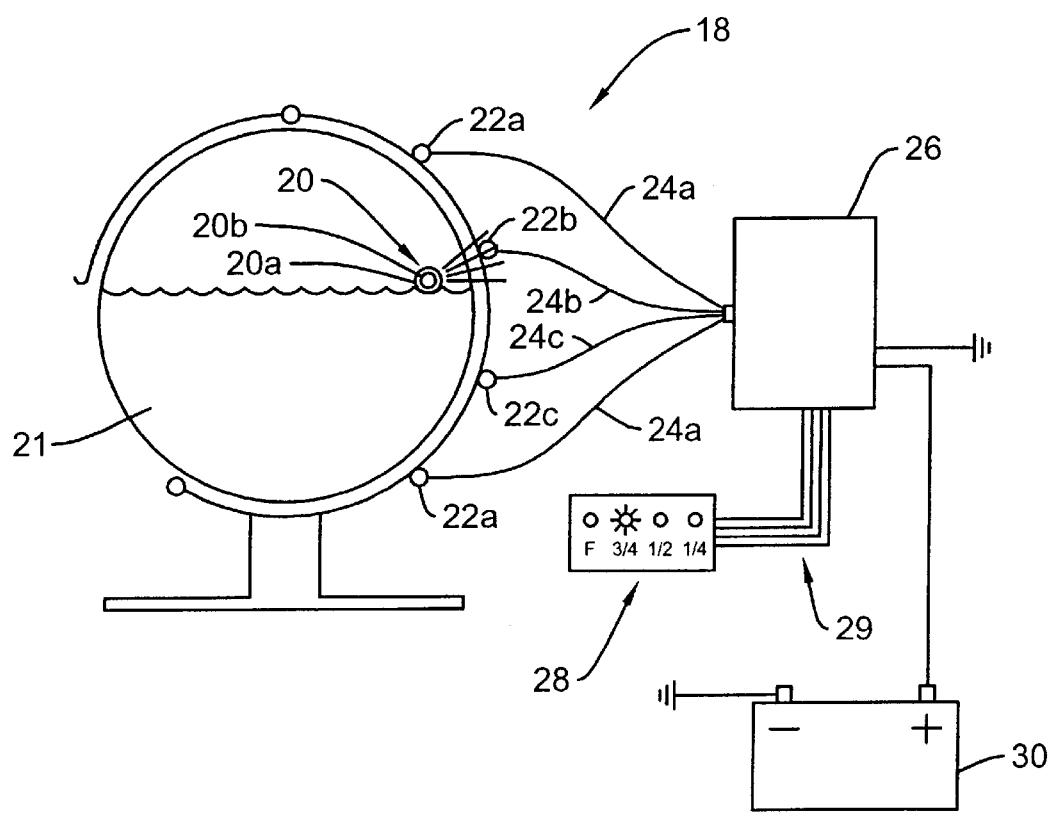
FIG. 2 shows an end view, in cross section, of the propane fuel tank of FIG. 1, and schematically shows the connection of a remote level monitoring system according to an exemplary embodiment of the present invention.

FIG. 2 depicts an exemplary embodiment of the level monitoring system of the present invention, generally referred to as the system 18. The system 18 includes a magnetic float 20 disposed within the container 12 of liquid propane 21, and one or more magnetic proximity sensors such as four sensors 22a–22d (collectively the "sensors 22") mounted onto or adjacent to the container mount 14. The float 20 can be made of a hollow or buoyant body 20a with at least a portion 20b thereof formed of or containing a magnetic material. The float 20 is made of a material selected for buoyancy and non-biodegradability in the fluid to be monitored. Also, the float 20 can be made of two discrete materials. For example, where the system 10 is used with commercially available liquid propane, the float body 20a made of a material such as that sold under the trade name NITROPHYL® by the Rogers Corporation of South Windham, Conn., and the magnetic portion 20b can be made of a conventional magnetic material. Alternatively, the float 20 can be made of more than two discrete materials or formed of a single material selected for the desired buoyancy and magnetic properties.

Figure 2A:
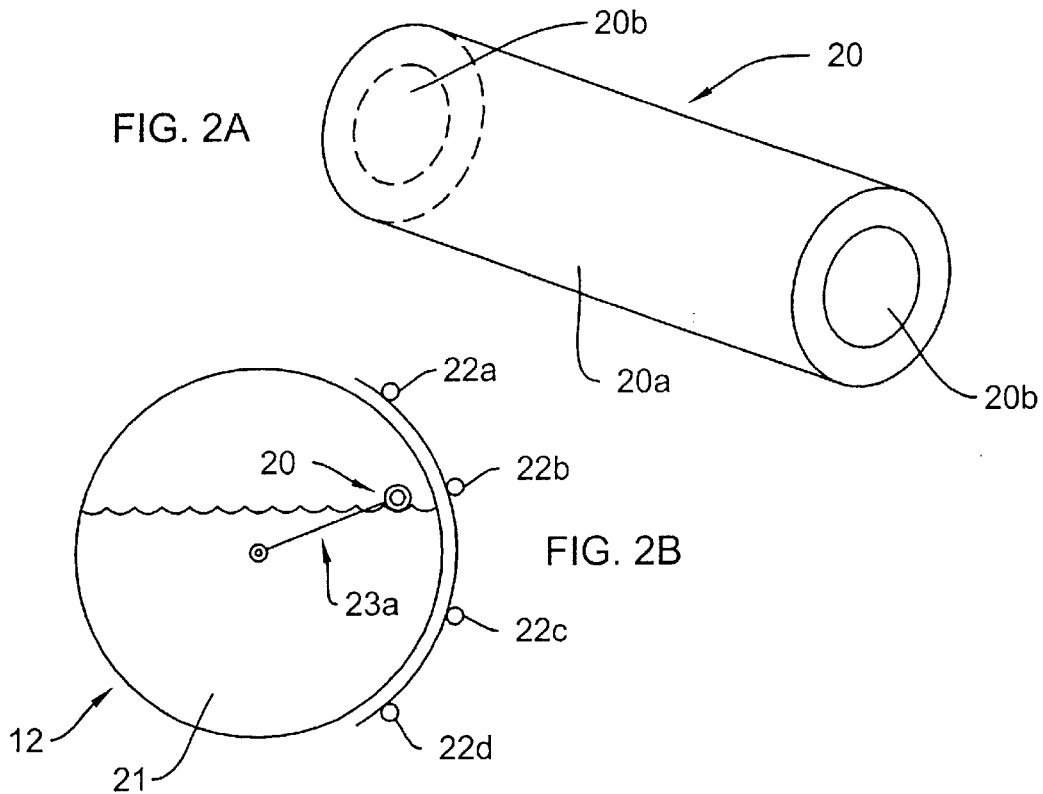
FIG. 2A shows a perspective view of the magnetic float of FIG. 2.

Additionally, the float body 20a can have a cylindrical, circular, rectangular, polygonal, or other regular or irregular shape, and the magnetic portion 20b can be disk-shaped, cylindrical, circular, rectangular, polygonal, or of another regular or irregular shape. Furthermore, the magnetic portion 20b can be mounted into or onto the float body 20a. For example, the float body 20a can be in the form of a cylinder and two magnetic portions 20b can be provided, with one portion positioned at an end of the cylindrical body and configured in an axial direction and the other portion positioned at a side of the cylindrical body and configured in a radial direction (see FIG. 2A). Alternatively, the float 20 can have three (or more) magnetic portions configured in three (or more) directions, as may be desired in a given application using a particular liquid and having a particular liquid level sensing requirement.

Figure 2B:
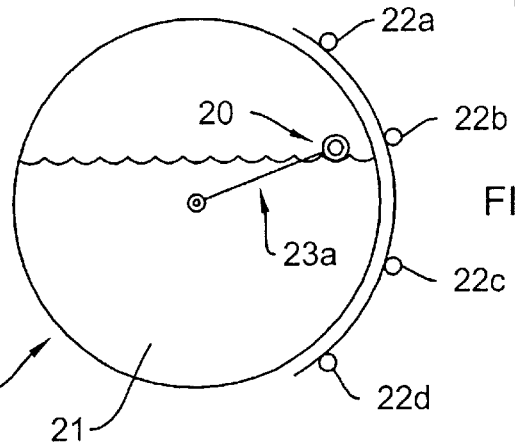
FIG. 2B shows an end view, in cross section, of a first alternative embodiment of the propane fuel tank with the magnetic float having a pivotal arm mechanical linkage.
Figure 2C:
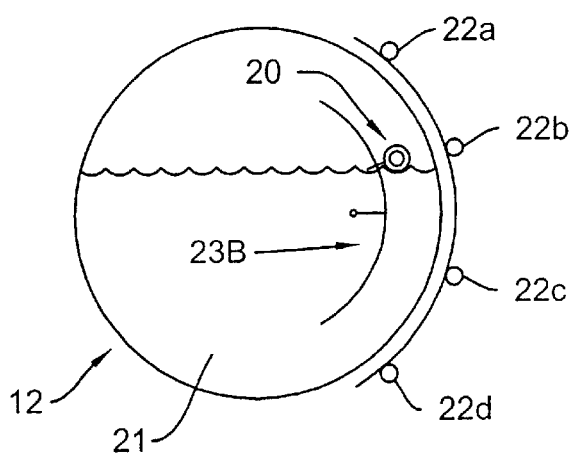
FIG. 2C shows an end view, in cross section, of a second alternative embodiment of the propane fuel tank with the magnetic float having a slide rod or track mechanical linkage.
Figure 2D:
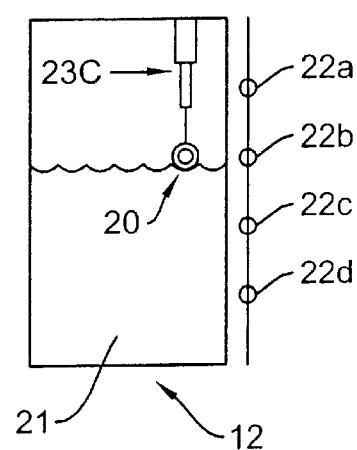
FIG. 2D shows an end view, in cross section, of a third alternative embodiment of the propane fuel tank with the magnetic float having a telescopic rod mechanical linkage.

The magnetic float 20 can be installed in the container 12 at the time of initial fabrication, or can be installed as an aftermarket retrofit. Also, more than one magnetic float 20 can be installed in the container 12 to increase the frequency with which a float will pass in proximity to a sensor 22. Furthermore, a mechanical linkage, magnetic attraction, or other means can be provided to constrain or bias the float 20 toward a location in the container 12 proximate to the sensors 22. For example, the float 20 can be coupled to a pivotal arm 23a that is pivotally mounted to an end of the cylindrical container 12 (see FIG. 2B), the float 20 can be slidably coupled to a fixed linear or curved rod or track 23b that is attached to an end of the cylindrical container 12 (see FIG. 2C), the float 20 can be attached to a telescopic rod 23b that is attached to an end of the cylindrical container 12 (see FIG. 2D), or other similar mechanical linkages can be suitably employed.

Turning now to the sensors 22, each sensor can be provided by a magnetic switch that closes (or opens) in response to sensing the proximity of the magnetic float 20. The sensitivity of the sensors 22 can be selected so that the float 12 triggers only one of the sensors 22 at a time. Thus, the sensitivity selection can be based at least in part on the desired number of sensors (based on the number of desired level indications), on the spacing of the sensors (based on the size of the container and the number of desired level indications), and the proximity of the sensors 22 to the float 20 (based on the thickness and material of the container wall, the size of the container, and how close the sensors 22 are mounted to the container 12. For example, commercially available sensors 20 such as a magnetic switch, part number 01-9800260, sold by Radio Shack® can be successfully used. Alternatively, the sensors 20 can be provided by one or more continuous level sensors which can be provided along all or a portion of the range of container level to be monitored, or other magnetic proximity sensors can be suitably employed as may be desired.

Figure 2E:
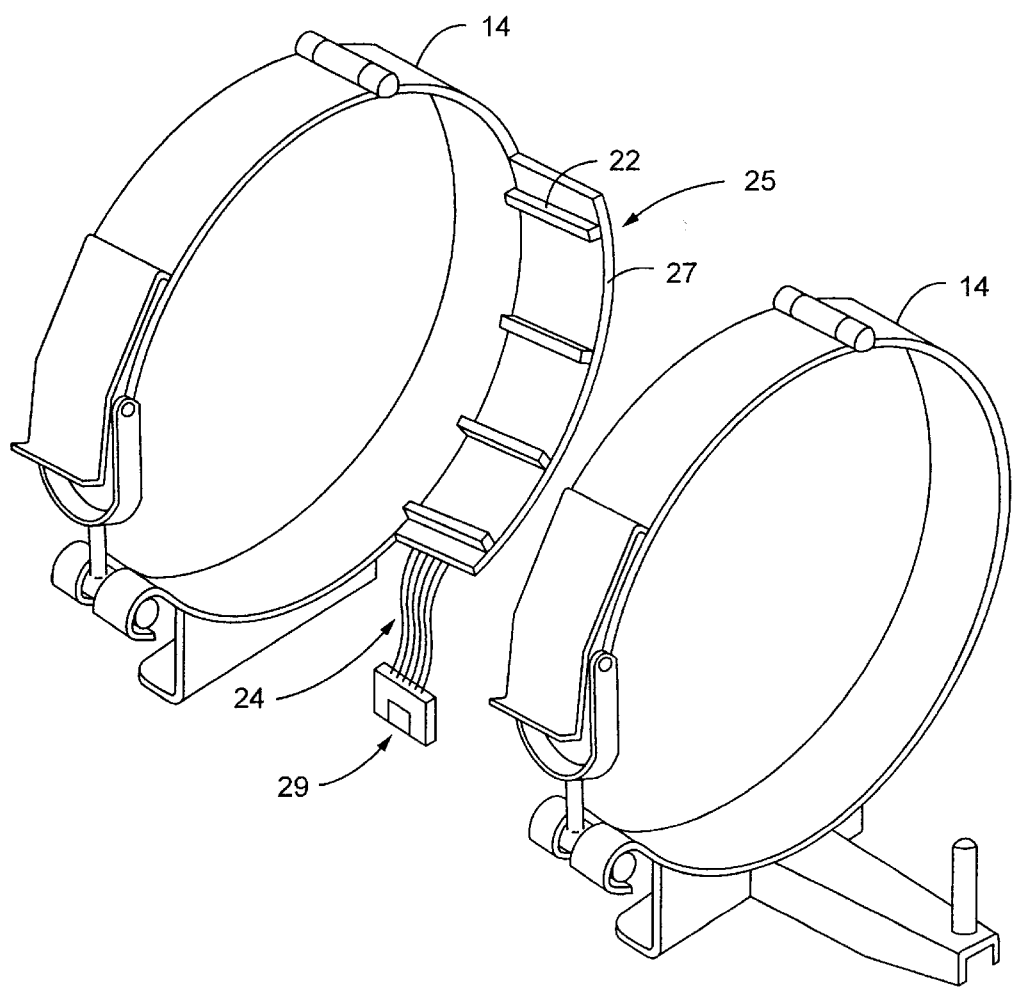
FIG. 2E shows a perspective view of an exemplary sensor assembly with a sensor mounting member installed on the container mount float of FIG. 2.
Figure 10:
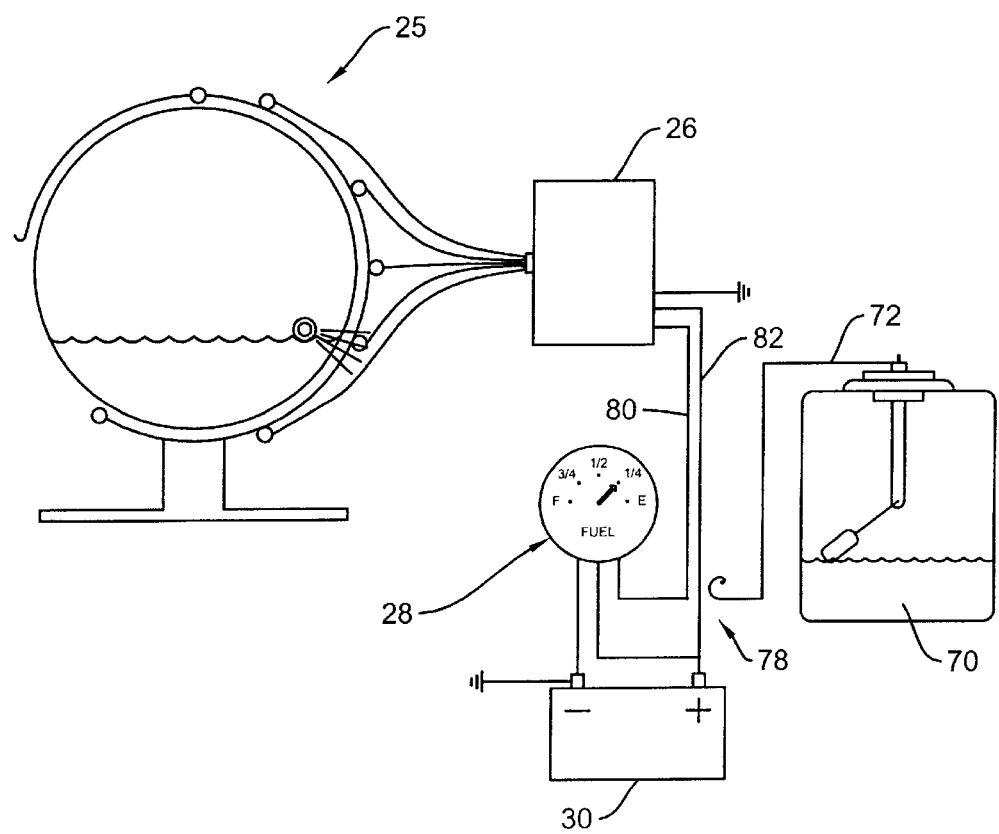
FIG. 10 is a schematic diagram showing the prior art gasoline gauge of FIG. 9 retrofit with the controller and sensor assembly of FIG. 2.

The sensors 22 are spaced at intervals corresponding to the desired level increments within the container 12. For example, four sensors 22a–22d can be proportionally spaced to correspond to the container liquid levels of "full," "¾ full," "½ full," and "¼ full," respectively. Alternatively, fewer or more sensors can be utilized, for example, five sensors can be provided for additionally indicating an "empty" liquid level (as shown in FIGS. 2E and 10), only one sensor can be provided for indicating only a low liquid level warning, or other numbers of sensors can be provided as may be desired in a given application.

The sensors 22 are mounted adjacent to the container 12, wherein adjacent in this instance means at least close enough to the container 12 that the sensors 22 can sense the proximity of the magnetic float 20, but not affixed directly to the container 12 itself. Because the sensors 22 are not affixed directly to the container 12, the container can be removed and replaced in standard fashion without the need for disconnecting the sensors or any portion of the system 18 coupled to the sensors. Thus, the sensors 22 can be mounted to the container mount 14, the forklift frame 11 adjacent to the container mount 14 and the container 12, or another structure adjacent to the container 12.

For example, a sensor assembly 25 can be provided with the sensors 20 fastened to a sensor mounting member 27 (see FIG. 2E) by epoxy, conventional fasteners such as screws or bolts, or other fasteners known in the art. The mounting member 27 can be fastened to the container mount 14 or the forklift frame 11 by conventional fasteners such as screws or bolts, epoxy, welding, or other fasteners known in the art. The mounting member 27 can be flexible or formed into a rigid curved shape so that the sensor assembly 25 can be arranged to conform to the curved shape of a cylindrical propane container 12. For example, the mounting member 27 can be provided by a chain strap such as part number 06-64-28 made by IGUS Chain Systems™ of Charlotte, N.C. Alternatively, the mounting member 27 can be made of a flexible strip of material such as a soft plastic, rubber, an elastomer, or the like, can have other shapes and/or rigidity/flexibility as may be desired for monitoring a particular container, and/or can be provided for generally horizontal mounting, generally vertical mounting, or other configurations. One or more sensor assemblies 25 can be used in one application, as may be desired. The sensor assembly 25 thus provides for quickly and easily mounting the sensors 22 in a proper position because the sensor spacing is preset and only mounting member 27 needs to be fastened in place (instead of several individual sensors 22).

The sensors 22 electrically communicate with a controller 26, which in turn communicates with an indicator 28. The communication can be by one or more electric conductors such as wires or cables. For example, four conductors 24a–24d (collectively the "conductors 24") can be connected to four sensors 22a–22d, respectively. Also, the controller 26 can be electrically connected to the indicator 28 by one or more conductors 29. In some applications it may be desirable to combine the controller 26 and the sensors 22 into a single assembly, or to combine the controller 26 and the indicator 28 into a single assembly, thereby minimizing the conductor lengths and number of pieces of equipment to mount.

The conductors 24 from the sensors 22 can terminate in a connector 29 (see FIG. 2E) that is received by the controller 26 directly or by a mating connecter at the end of conductors connected to the receiver 26. This arrangement allows for installing the sensors 22 (or sensor assembly 25 of FIG. 2E) and the controller 26 unhindered by wire length restrictions, and then connecting the sensors 22 to the controller 26. Additionally or alternatively, a connector can be provided in the conductors 29 between the controller 26 and the indicator 28.

Alternatively, the communication of the sensors 22 with the controller 26 and the controller 26 with the indicator 28 can be provided by wireless transmission. For example, an infrared or radio transmitter can relay level measurement signals from the sensors 22 to the indicator 28. In another alternative, the sensors 22 can be mechanically connected to the controller 26 by a mechanical linkage of a fashion known by those skilled in the art.

The indicator 28 can be provided by an analog gauge, a digital display, one or more lights of the same or different colors, one or more buzzers, and so forth. For example, the indicator 28 can include one or more lighted level indicators such as four light emitting diodes (LED's) 28a–28d corresponding to the level of the sensors 22a–22d, respectively. The indicator 28 can be installed along or near the direct line of sight of the operator in normal use so that the user will periodically observe the sensor as part of the routine operation of the vehicle. For example, the indicator 28 can be mounted into the dashboard of the vehicle, in a box atop the dashboard, to a bracket under the dashboard, or in another position remote from the container 12 where the operator of the vehicle can readily see the indicator 28. It will be understood that the indicator 28 can be installed in any desired position, whether remote from the container or not, that may be preferred in a given situation. Remote in this instance means that the indicator 28 is not physically attached to the container 12.

Additionally, a power source 30 such as a conventional battery, generator, or line voltage is connected to the system 18 to energize the monitoring system. For example, the components of the system 18 can be selected for use with a conventional 12 volt battery as is commonly provided in a wide variety of vehicles.

Generally described, the controller 26 receives and processes signals from the sensors 22 and, in turn, sends level indication signals to the gauge 28. The controller 26 can be an electronic processor, mechanical controller, or other means for processing and communicating signals from the sensors to the corresponding level indicator. Thus, those skilled in the art will recognize that, in place of and/or in addition to the below-described embodiments, the controller 26 alternatively or additionally can comprise the provision of a mechanical, electronic, and/or software-programmed logic-controlled switching arrangement such as a transistorized and/or integrated circuit switching assembly.

Figure 3:
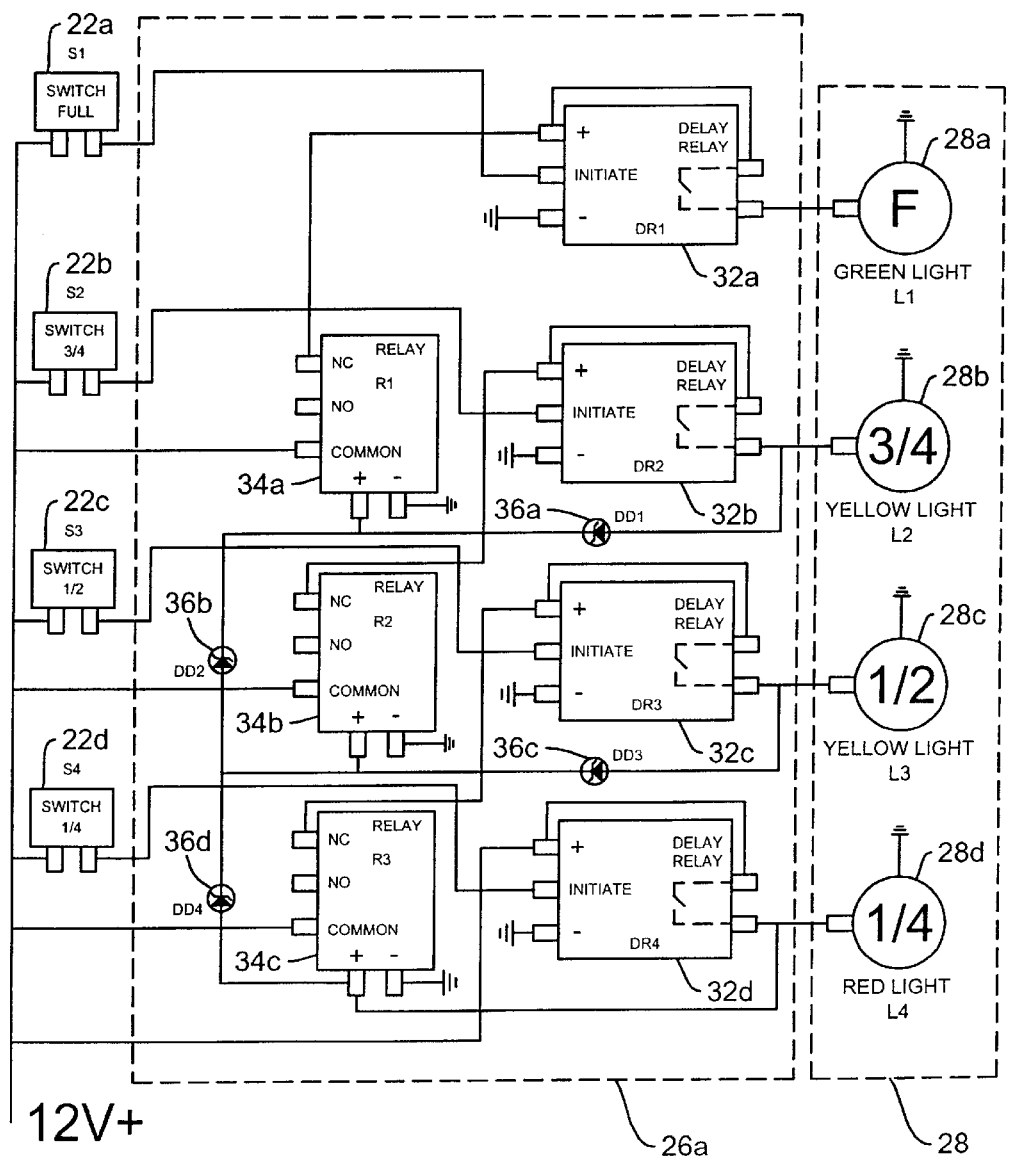
FIG. 3 is a schematic diagram of a first exemplary controller connected to the sensors and indicator of FIG. 2.
Figure 4:
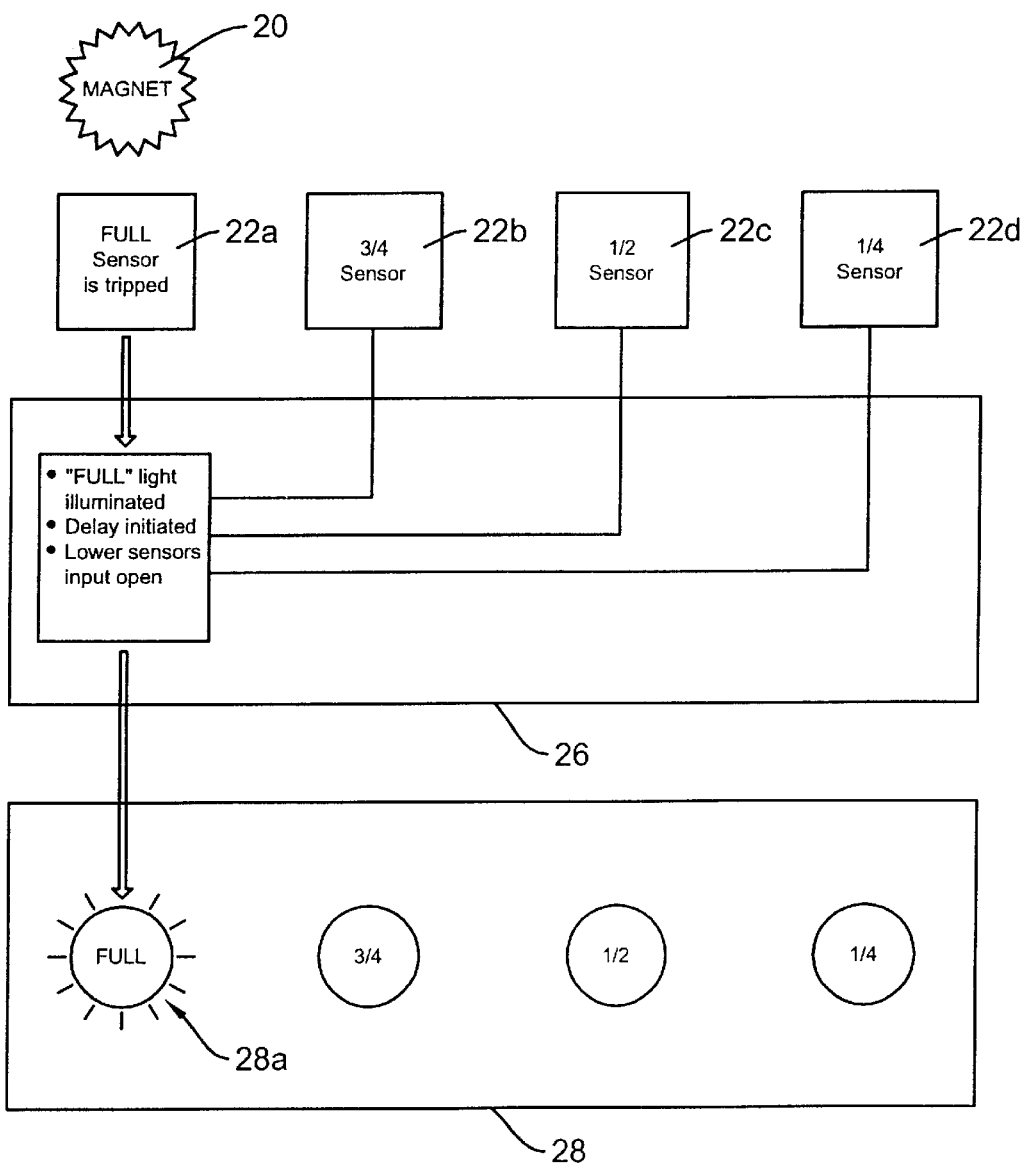
FIG. 4 is a schematic diagram showing the operation of the remote level monitoring system of FIG. 3, indicating a full tank level.
Figure 5:
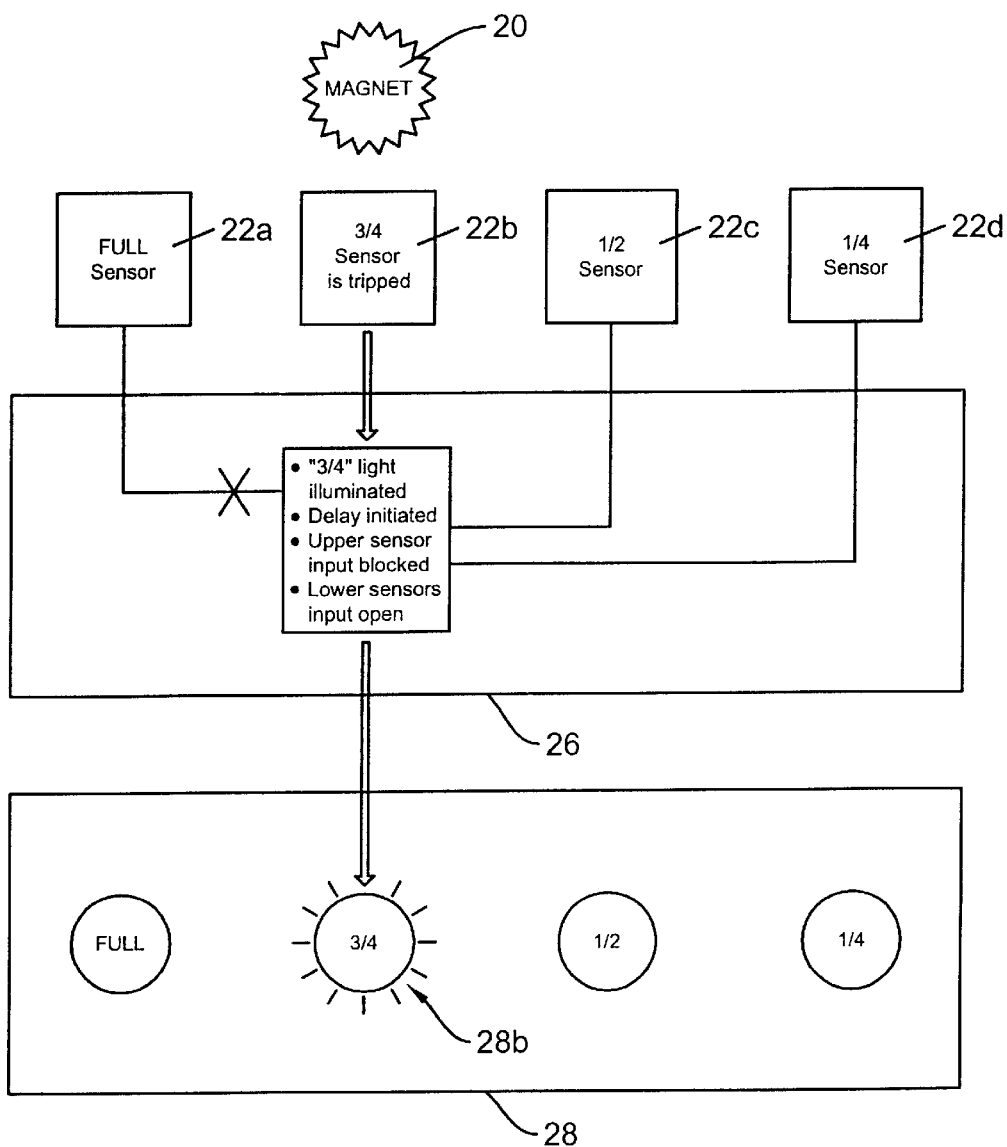
FIG. 5 is a schematic diagram showing the operation of the remote level monitoring system of FIG. 3, indicating a ¾ full tank level.

FIGS. 3–7 generally illustrate the controller 26 and its operation, with FIG. 3 schematically depicting a first exemplary embodiment 26a of the controller connected to four sensors 22a–22d and four level indicators 28a–28d, and FIGS. 4–7 illustrate the functioning of the exemplary controller 26a of FIG. 3 and the present method of remote monitoring of a liquid level in a container. The level monitoring sequence can start upon the triggering of any of the sensors 22a 22d, that is, upon the magnetic float 20 coming into proximity with any of the sensors 22a–22d and closing the switch of that sensor. Delay relays 32a–32d have internal timers that are continuously reset to thirty minutes if the corresponding sensor 22a–22d is triggered again during that delay relay's thirty minute cycle. Of course, those skilled in the art will recognize that delay relay timer settings of greater or less than 30 minutes can be utilized, depending upon the size of container 12, typical fuel consumption rates, likely frequency and amplitude of level oscillations within the container, and other factors related to a particular system. An absence of voltage resets the sequence, and an optional sequence reset button or switch can be installed, for example, at the power source 30.

When the process starts with a full container 12 of fuel, the electrical process from "full" to "empty" starts with the full sensor 22a being triggered by its proximity to the magnetic float 20. The switch of sensor 22a closes, applying voltage to the initiate terminal of "full" delay relay 32a, thus triggering its internal timer to provide a thirty minute continuous voltage supply to the indicator 28a corresponding to a "full" level reading (see FIG. 4). The surface area of the switches of the sensors 22 can be small. If the magnetic float 20 drifts away from sensor 22a, delay relay 32a will continue to provide power to indicator 18a for up to thirty minutes. The internal coil of relay 34a does not receive a voltage when the "full" indicator 18a triggered by sensor 22a is in operation, so voltage is supplied through the "normal closed" switch of relay 34a directly to delay relay 32a.

As fuel is consumed, the magnetic float 20 moves downwardly with the surface level of fuel within cylinder 12. When the float 20 descends to a position proximate the "¾ full" sensor 22b, the sensor switch closes thereby applying voltage to the initiate terminal of "¾ full" delay relay 32b, thus triggering its internal timer to provide thirty minute continuous voltage to the "¾ full" level indicator 18b (see FIG. 5). Even if the float 20 drifts away from the sensor 22b, delay relay 32b will continue to energize the indicator 18b for up to thirty minutes. The voltage to the indicator 18b also powers up relay 34b, thus opening the "normal closed" circuit of relay 34a and not allowing power to be available at delay relay 32a even if sensor 22a is triggered by an upward movement of the float 20. This eliminates a constant flickering of the indicator lights due to common oscillations of the liquid level within the cylinder 12. A first directional diode 36a allows power to go to relay 34a. A second directional diode 36b stops the back flow of voltage to the lower relays and indicators.

Figure 6:
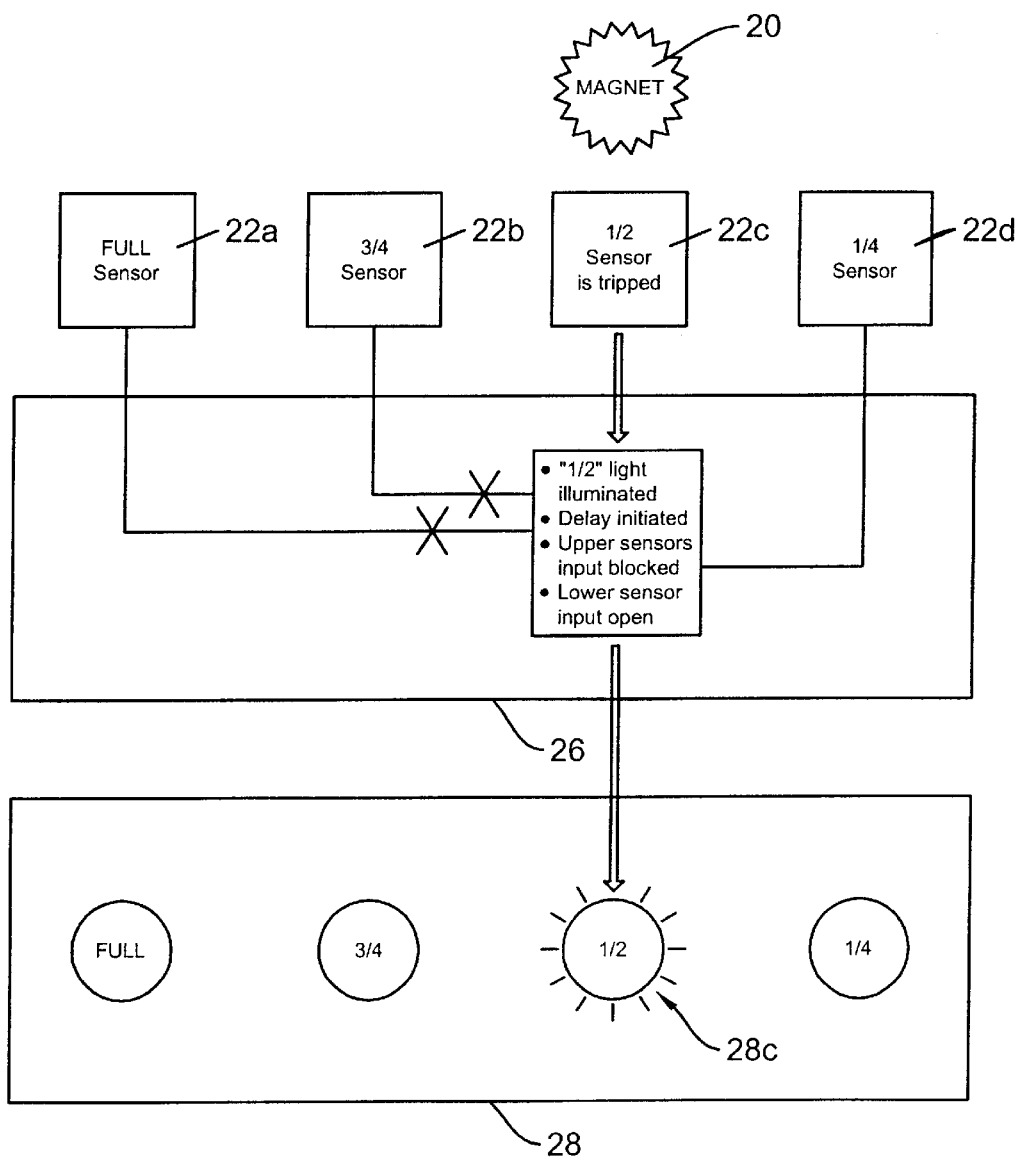
FIG. 6 is a schematic diagram showing the operation of the remote level monitoring system of FIG. 3, indicating a ½ full tank level.

With continued fuel consumption, the magnetic float 20 moves down to a position proximate the "½ full" sensor 22c, which closes and thereby applies a voltage to the initiate terminal of "½ full" delay relay 32c, thus triggering its internal timer to provide a thirty minute continuous voltage supply to the "½ full" level indicator 18c (see FIG. 6). Even if the float 20 drifts away from the sensor 22c, delay relay 32c will continue to supply power to indicator 18c for up to thirty minutes. The power supply to indicator 18c also powers up relay 34b thus opening the "normal closed"

circuit of relay 34b and not allowing power to be available at delay relay 32b even if sensor 22a or sensor 22b is triggered by an upward movement of the magnetic float 20 due to oscillation of fuel within the cylinder 12. A third directional diode 36c allows voltage to go to relay 34b opening the "normally closed" switch, thus not allowing voltage to delay relay 32b. The second directional diode 36b allows voltage to go to relay 34a, opening the "normally closed" switch, thus not allowing voltage to delay relay 32a. The first directional diode 36a stops the back flow of voltage to indicator 18a.

Figure 7:
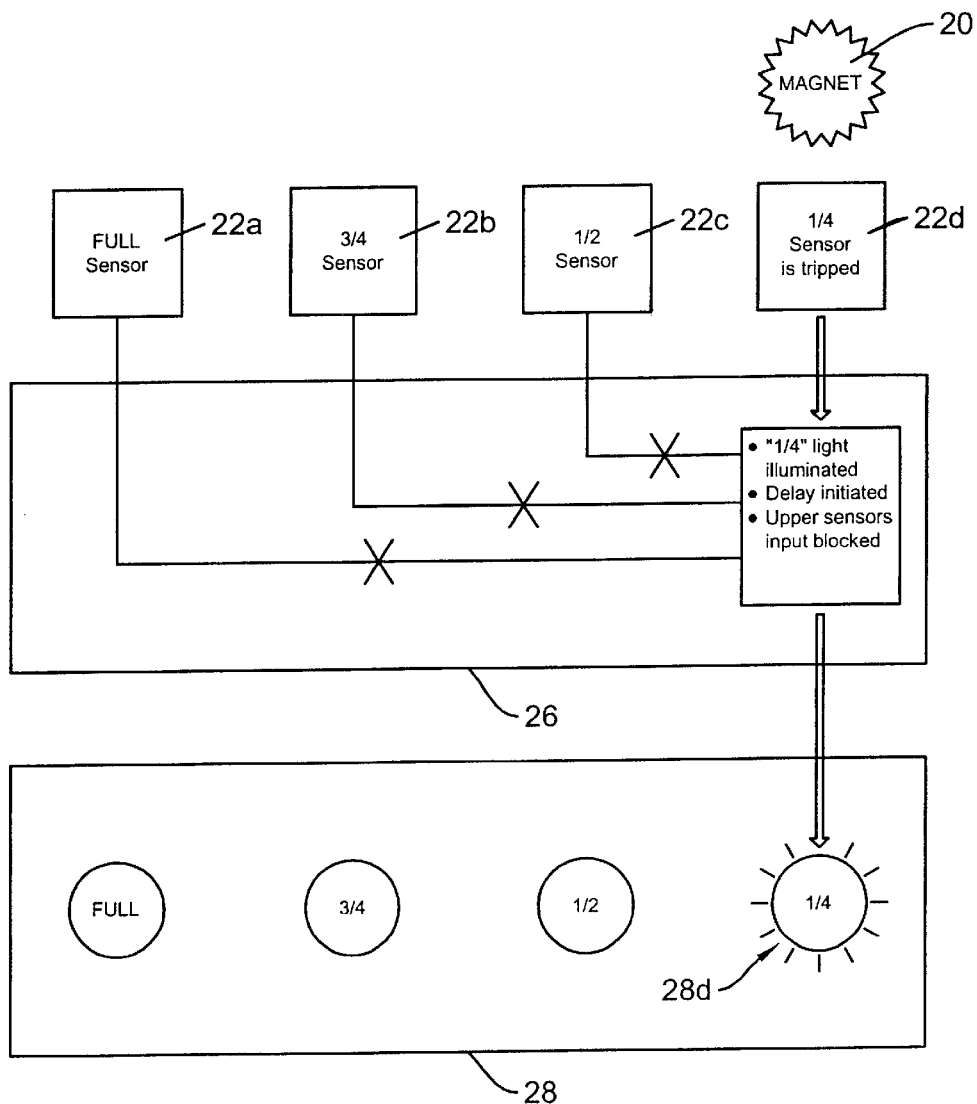
FIG. 7 is a schematic diagram showing the operation of the remote level monitoring system of FIG. 3, indicating a ¼ full tank level.

With continued fuel consumption, the magnetic float 20 moves down to a position proximate the "¼ full" level sensor 22d, which closes and thereby applies sends a voltage to the initiate terminal of the "¼ full" delay relay 32d thus triggering its internal timer of a thirty minute continuous voltage supply to the "¼ full" indicator 18d (see FIG. 7). Even if the float 20 drifts away from sensor 22d, delay relay 32d will continue to provide power to indicator 18d for up to thirty minutes. The voltage supply to the indicator 18d also powers up relay 34c, thus opening the "normally closed" circuit of relay 32c and not allowing voltage to be available at delay relay 32c even if sensor 22a, sensor 22b, or sensor 22c, is triggered by an upward movement of the magnetic float 20 due to oscillation of the fuel level within the cylinder 12. A fourth directional diode 36d allows voltage to relay 34b, opening the "normally closed" switch, thus not allowing voltage to delay relay 32b. The second directional diode 36b allows voltage to relay 34a, opening the "normally closed" switch, thus not allowing voltage to delay relay 32a. The first directional diode 36a stops the back flow of voltage to indicator 18a. The third directional diode 36c stops the back flow of voltage to indicator 18c.

The delay relays 32a–32d, relays 34a–34d, and diodes 36a 36d can be provided by commercially available components. For example, the delay relays 32a–32d can be provided by part no. DSQUD3 sold by SSAC Inc., the relays 34a–34d can be provided by part no. 01-9800122 sold by Radio Shack®, the diodes 36a 36d can be provided by part no. 01-9002925sold by Radio Shack®, and all the components can be mounted in an enclosure. Of course, it will be readily apparent to those skilled in the art that these components are by way of example only, and will vary with the requirements of particular systems, availability, cost, and other factors. Also, it will be understood that the number and arrangement of indicator lights, sensors/switches, relays, and other components described herein are only for reference, and will vary depending on the particular application at hand. Also, the quantity and colors of level indicator lights may vary.

Because liquid fuel will often move about significantly within the cylinder during use due to the movement of the vehicle, the present invention can provide means for maintaining a constant fuel level indication despite significant oscillations of the fuel within the cylinder. In an exemplary embodiment, the present invention includes "delay on break" circuitry, such as that described above, which enables a particular level indicator light 18a–18d to remain illuminated for approximately thirty minutes after the magnetic float 20 moves away from the previously triggered sensor 22a–22d. The relay arrangement is wired in such a way as to not supply power to a sensor above the one in the array that is then tripped so as not to have a constant or periodic on/off flickering effect. When a lower light is illuminated, an upper light in the array is no longer required, and it can de-energized. The design of the system allows a reset of all the sensors 22 when the power to the system is momentary interrupted, either with a manual reset button or when the machine is turned off for changing out an empty cylinder 12. When a new cylinder is installed and power is reapplied, all the sensors 22 are available for taking a reading. For instance, if a replacement cylinder 12 happens to be "½ full" when power is reapplied, the controller 26 will receive the "½ full" signal and not allow any power to the "¾ full" 22b or "full" sensors 22a in case of fuel sloshing upwards. Upward movement of the fuel in a cylinder is common, whereas downward movement is typically minimal.

Figure 8:
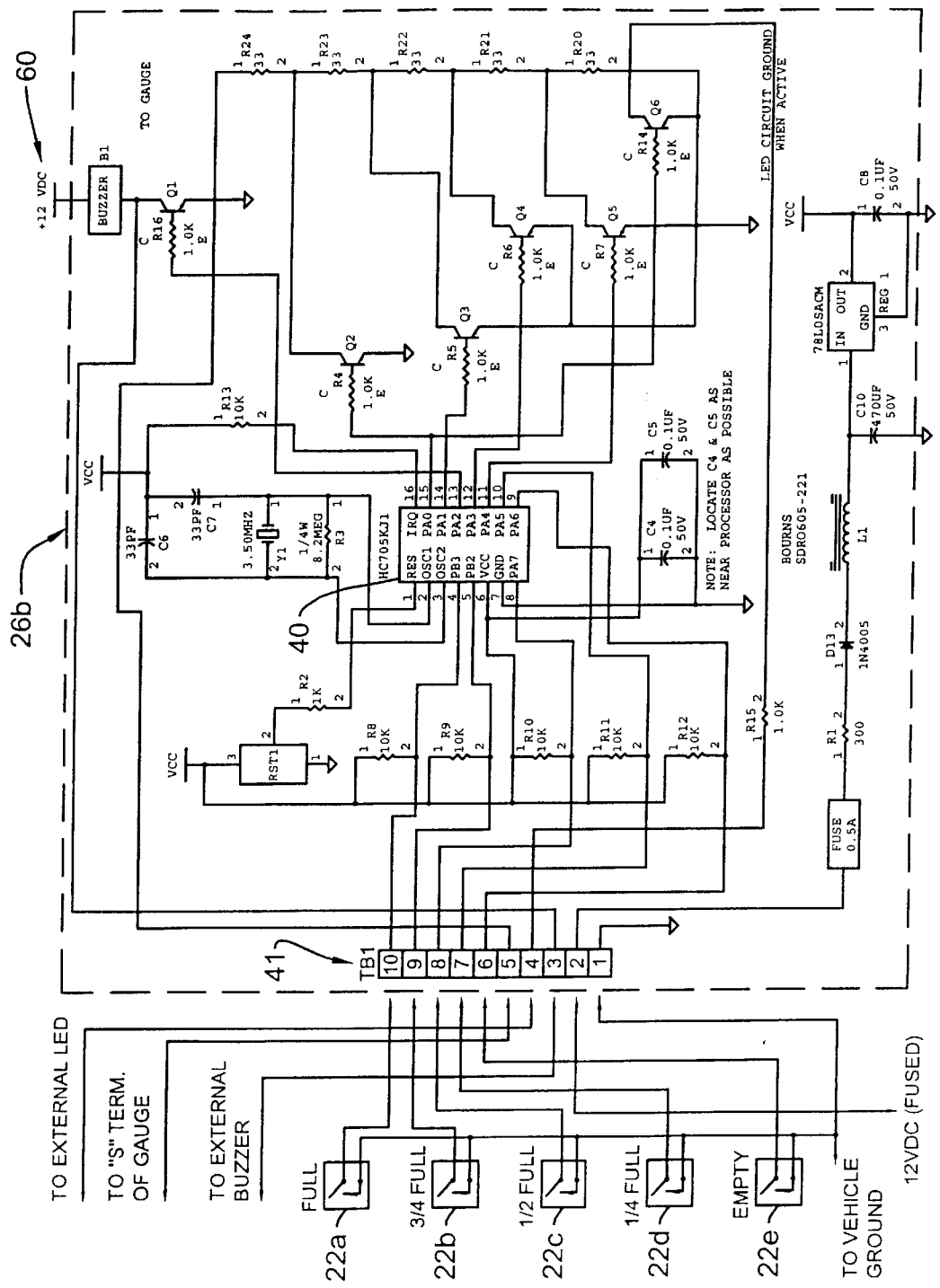
FIG. 8 is a schematic diagram of a second exemplary controller connected to the sensors and indicator of FIG. 2.
Figure 8A:
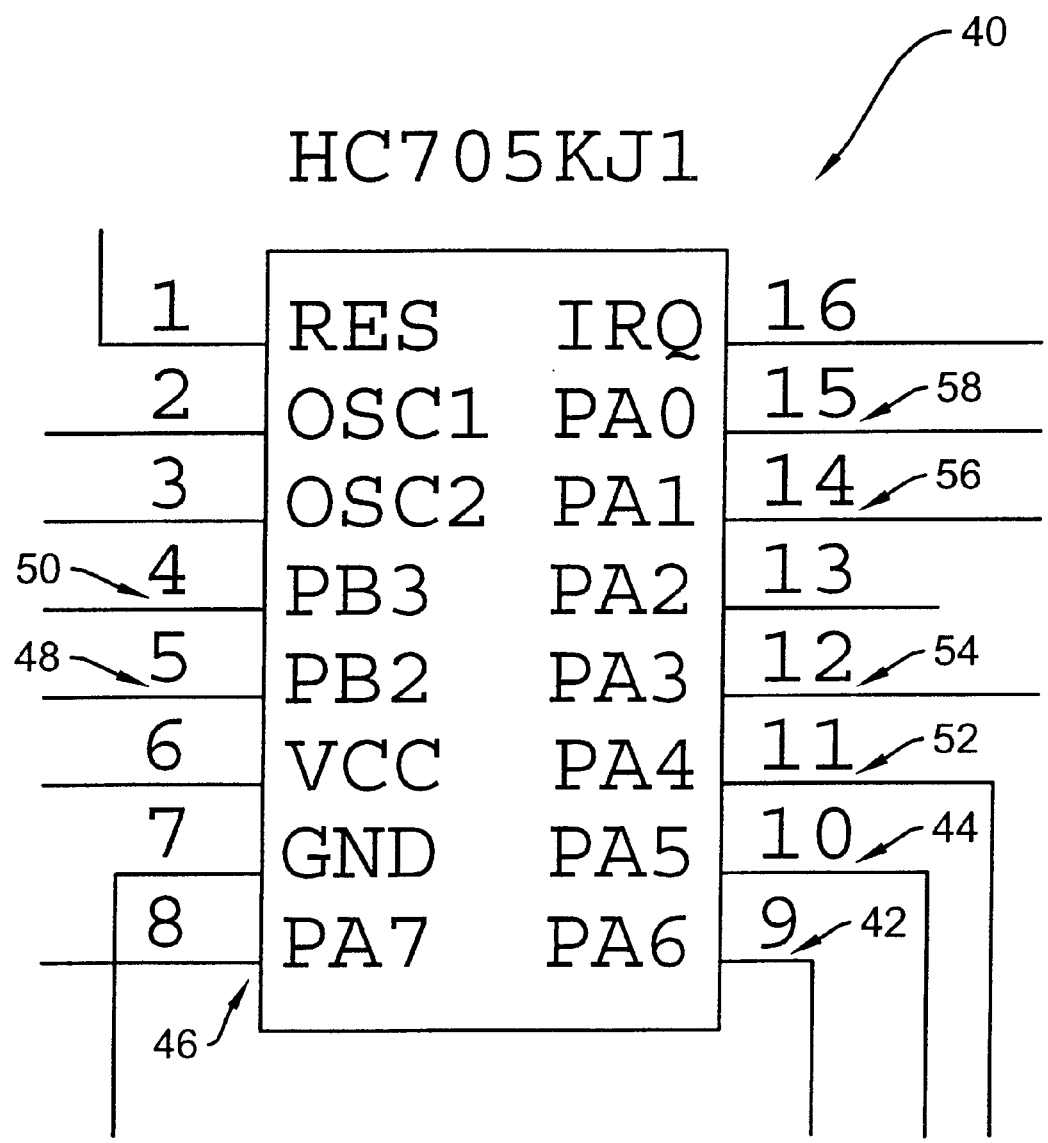
FIG. 8A is a detail view of the chip of the controller of FIG. 8.

FIGS. 8 and 8A schematically depict a second exemplary embodiment 26b of the controller 26, which in this embodiment comprises a PLC 40 such as a 16 pin PLC. The PLC 40 can be programmed for on/off switching based on time, the number of sensor hits, and so forth. The PLC 40 can be connected to various other electronic components such as resistors, capacitors, transistors, diodes, and so forth, of the commercially available type, installed on a circuit card, and mounted in an enclosure. A person of ordinary skill in the art will understand that the PLC 40 and other circuit components can be arranged in various configurations for producing the desired result of receiving input signals from the sensors 22 and transmitting output signals to the indicator 28 for indicating the liquid level of the container 12.

In the second exemplary controller 26b, five magnetic proximity sensors 22a–22e each comprise a magnetic switch that closes upon coming into proximity with the magnetic float 20. Upon closing, the sensors 22 send signals to pins 50, 48, 46, 44, and 42 on the PLC 40. These input signals are received from the "full" to the "empty" sensors 22a–22d, respectively, that are spaced at corresponding level points along the cylinder 12. The controller 26b can have a terminal block 41 or other connector for electrical connection to the sensors 22.

The operation off the second exemplary controller 26b will be described in use with a gasoline type dash gauge indicator 28. The gauge can read "empty" when all outputs from the PLC 40 to the gauges are off, "¼" when pin 52 is the output, "½" when pin 54 is the output, "¾" when pin 56 is the output, and "full" when pin 58 is the output. Of course, the PLC 40 can be configured with pin arrangements and connections, circuit components, and so forth, other than those shown and described; the controller 26b is shown and described in a specific manner herein for illustration purposes only. The controller 26b is powered through a connection to a power source such as the battery 60 of the machine. The controller 26 can be configured to receive power all the time, even in the machine is turned off. Furthermore, it will be assumed that a full propane cylinder 12 was placed in the container mount to run the machine.

The PLC 40 is initially in default mode. A variable signal can be sent to the dash gauge 28 from pins 52 and 56 so that the gauge is fluctuating between a reading of ¼ and ¾. This will show that the controller 26b is in default and ready for operation. This pulsing can continue indefinitely until a signal is received from one of the sensors 22a–22e. If the pulsing continues for an excessive amount of time, it can indicate the cylinder 12 is empty, not functional, or not designed to be used with the system, or that the machine has not been moved.

Assuming that the machine is now in operation and is moved, the float 20 begins to move around the inside of the cylinder 20. Before long the magnetic float 20 passes the "full" sensor 22a and which closes and sends a ground signal to pin 50. The PLC 40 receives the input signal and sends a continuous resisted ground output signal from pin 58 to the gauge 28 so that it reads a steady "full". The "full" sensor 22a will usually receive many more "hits" from the float 20 during normal operation, and these are discarded.

As the machine runs and consumes the fuel in the cylinder, the liquid level in the cylinder 12 drops. Thus, the "¾" sensor 22b may receive a stray hit from the float 20. The PLC 40 can be configured so that it will not change from the "full" output pin 58 to the "¾" output pin 56 until the "¾" sensor 22b receives five hits without the "full" sensor 22a canceling with three hits. Of course, the PLC can be programmed to stay on the "full" output pin 58 until the "¾" sensor 22b receives more or less than five hits without the "full" sensor 22a canceling with more or less than three hits. Also, it will be understood that the controller 26b is described with reference to "full" and "¾" cylinders levels, but the same controller operation is applicable to any other levels.

Additionally, the PLC 40 can be programmed to automatically reset the hit count after receiving any number of canceling hits from the "full" sensor 22a, after a predetermined period of time, after a combination of these, or after some other event. For example, where the number of canceling hits required to reset the hit count is set at three, then when the "¾" sensor 22b receives three hits in a row and the "full" sensor 22a receives three hits right after that, the PLC 40 will not change the reading. The three "full" sensor 22a hits resets the count. If the "¾" sensor 22b then receives four more hits, the gauge still will not change. The PLC 40 can be programmed to wait only a predetermined amount of time to see if the "full" sensor 22a will reset the hit count, or to continue waiting until the fifth hit is received, before the output is changed to the "¾" level line of the gauge.

This same programming can be used for all the other sensor inputs except the "empty" output pin 42. The PLC 40 will not change the gauge to "empty" until the "empty" sensor 22d, receives a specified number of hits, for example, ten sequential "empty" sensor 22d, hits without any intervening hits from other sensors. In this case, if the PLC 40 receives nine "empty" sensor 22d, hits and then even a single "¼" sensor 22d, hit, the hit count will reset to zero. This hit count can be selected to provide an "empty" reading on the gauge when a certain amount of liquid remains in the cylinder, such as no less than ½ gallon of propane remaining in the cylinder, or another amount as may be desired in a given application.

Additionally, the PLC 40 can be programmed so that, after the sequence has reached the "¼" or below level, the gauge reading is changed to "full" (or another reading) upon two consecutive hits of the "full" sensor 22a (or the corresponding sensor). This denotes that the cylinder 12 has been replaced with a cylinder with more fuel. This configuration is advantageous in many applications where it is extremely unlikely that the fuel will "slosh" enough from a "¼" level or below to send the float 20 high enough to trigger a "½" or higher hit.

Additionally, the PLC 26b can be programmed so that the gauge reading will not change upon receiving two hits of any sensor 22a–22e in less than a predetermined time period such as one second. Instead, multiple hits of any amount in less than one second can be counted as one hit.

As mentioned above, the fuel can move quite a bit with heavy movements, mainly upwardly, but also downwardly. Therefore, the PLC 40 can be programmed so that a lower sensor input signal will count towards the hit count of the next closest higher sensor. For example, when the gauge reading is at "½" and the PLC 40 receives a hit from the "¼" sensor 22d, the PLC can count this as a hit from the "¾" sensor 22b.

Alternatively, the controller 26 can have a PLC that is programmed to initially set the light or other indicator 28 based on its first observed sensor input from any sensor 22. The PLC can maintain the light in its illuminated state indefinitely or for a predetermined period of time, such as thirty minutes. After thirty minutes, the controller resets. Illumination of successive indicator lights is allowed to progress only in a downward liquid level direction (i.e., from "full" toward "empty"), and only after the next lower sensor in the array (22a to 22e) has received at least about five (or some other predetermined number) of signals in a minimum period of time. This period can be, for example, about one minute (or some other predetermined duration). This helps eliminate many false readings that might otherwise occur, such as an indication of a quick drop in fuel level to the bottom of a cylinder that could result from fuel sloshing within a cylinder and causing the float 20 to pass proximate the lowest sensor 22e, when the cylinder has a true level above another of the sensors 22a–22d.

Turning now to another form of the invention, in addition to new installations, the above-described exemplary embodiments of the invention can be retrofit onto machines with pre-existing fuel gauges. For explanation purposes only, the retrofit method will be described with reference to a forklift with a pre-existing gasoline gauge indictor that has been converted from gasoline to propane. It will be understood that the method does not necessarily have to performed in the sequence described, but instead other sequences can be suitably performed.

Figure 9:
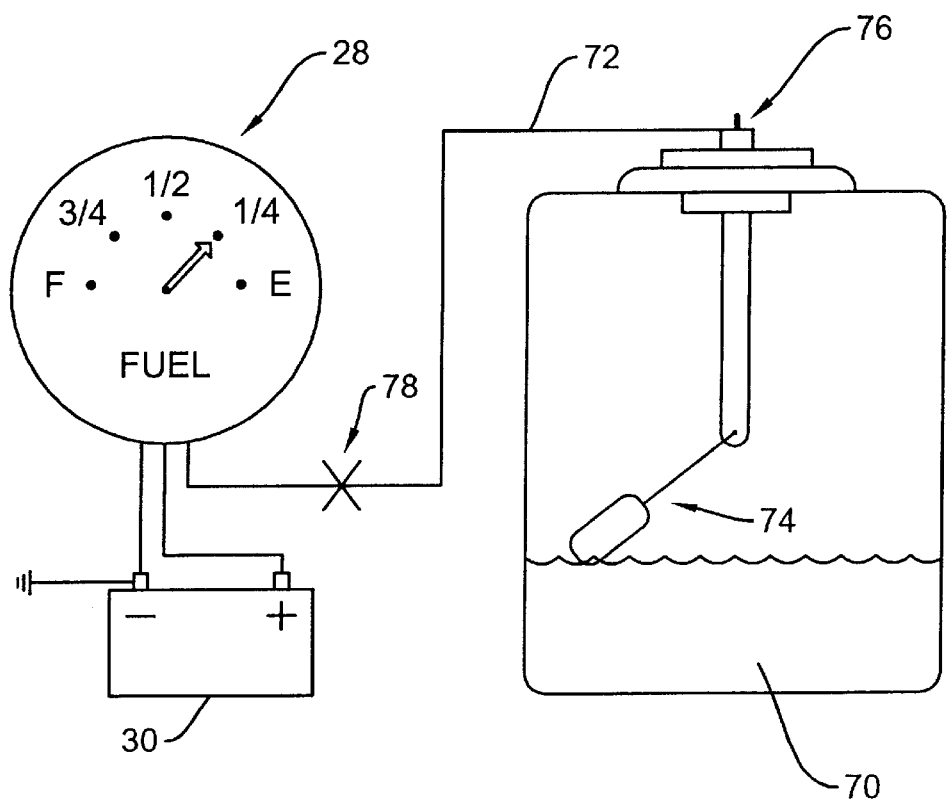
FIG. 9 is a cross section view of a prior art gasoline tank, and schematically shows the connection of gasoline tank to a prior art gasoline gauge.

FIG. 9 depicts a prior art gasoline fuel system for a conventional forklift, having an indicator gauge 28, a battery 30, and a fuel tank 70. An electrical conductor such as control wire 72 connects the tank 70 to the gauge 28. Conventional dashboard-mounted gauges are basically receivers that read a signal generated by a level indicator mechanism with a float 74 mounted in the fuel tank 70. The level of the float 74 causes a variable resistance to ground of a sender 76 mounted to the top of the tank 70. The gauge 28 can display a reading from "full" to "empty" based on the amount of resistance to ground through the control wire 72. As the float 74 moves up or down based on liquid level in the tank 70, the amount of resistance to ground correspondingly changes the reading on the gauge 28. The amount of resistance that the gauge 28 reads can be matched to the particular sender 76. So the resistance characteristics of the sender 76, in ohms at "empty," "full," and/or anywhere between is used to select the gauge to be used.

FIG. 10 depicts the method of retrofitting the invention onto an existing indicator such as dial gauge 28. A cylinder is provided that was originally fabricated with a magnetic float therein, or a pre-existing cylinder is refitted with a magnetic float. For example, a conventional cylinder can be opened, such as by removing a valve, plug, or the like, a magnetic float can be dropped into the cylinder, and the cylinder can be closed such as by reinstalling the valve, plug, or the like. The cylinder is then filled with the desired fuel such as propane. The sensor assembly 25 and the controller 26 are mounted onto the forklift, and the controller 26 is grounded. The control wire 72 is cut or otherwise severed at location 78 (see also FIG. 9) anywhere between the tank 70 and the gauge 28. A connecting conductor such as control wire 80 is electrically connected from the controller 26 to the gauge 28. Also, a conductor such as power wire 82 is electrically connected from the controller 26 to the battery 30. Additionally, the control wires 72 and 82 can be connected to a switch thereby allowing the gauge 28 to receive signals from either the gas tank 70 or the propane cylinder 12, for use on a forklift that uses both gasoline and propane as an engine fuel The controller 26 is configured to match the resistance values of the particular gauge to be used. These resistance values are determined by the particular dash gauge that the system is connected to and the controller resistors can be easily selected to match the gauge resistors. The resistance values themselves are not necessarily exact, but for this explanation it will be assumed that they are.

Controllers 26 can be manufactured with resistance characteristics to match the resistance characteristics of the various conventional gauges, so that a controller with the desired resistance characteristics can be readily selected and installed in a given application based on the particular gauge being used. For retrofitting the first exemplary controller 26a of FIG. 3, the output from delay relay 32a through delay relay 32d can be selected to drive the gauge 28. For retrofitting the second exemplary controller 26b of FIG. 8, the PLC 40 can be programmed to simulate the ground resistance reading needed to drive the gauge 28. For example, many conventional gauges have 0–90 ohm resistance range, where about 10 ohms indicates "full" and about 80 ohms indicates "empty." Thus, a controller can be pre-assembled with a PLC programmed with resistance characteristics selected to operate a gauge that responds as desired to 0–90 ohm resistance range.

While the invention has been shown and described in exemplary forms, it will be apparent to those skilled in the art that many modifications, additions, and deletions can be made therein without departing from the spirit and scope of the invention as set forth in the following claims.

What is claimed is:

1. A system for remote monitoring of a level of a liquid within a container, said system comprising:
    one or more magnetic proximity sensors disposed external of and adjacent to said container;
    at least one magnetic float disposed within said container and free-floating on said liquid surface so that said float is not constrained from lateral movement moves laterally into and out of proximity with said sensors in response to movement of said container, wherein said magnetic float is sensible by said sensors only when said float is in proximity with said sensors;
    an indicator disposed remote from said container and having one or more liquid level indicators each corresponding to one of said sensors; and
    a controller for receiving one or more input signals from each said sensor and communicating one or more corresponding output signals to said corresponding level indicator, wherein said level indicators indicate said level of said liquid within said container.

2. The remote monitoring system of claim 1, wherein each of said magnetic floats comprises an elongate body that is buoyant in said liquid and that has at least two portions comprising a magnetic material, wherein one of said magnetic portions is positioned at an end of said elongate body and configured in an axial orientation and another of said magnetic portions is positioned at a side of said elongate body and configured in a radial orientation generally perpendicular to said axial magnet.

3. The remote monitoring system of claim 1, wherein said sensors are disposed adjacent to said container in positions corresponding to container liquid levels selected from the group consisting of full, ¾ full, ½ full, ¼ full, and empty.

4. The remote monitoring system of claim 1, further comprising a sensor mounting member, wherein each of said sensors is coupled to said mounting member.

5. The remote monitoring system of claim 1, wherein said sensors are disposed at least close enough to said container that said sensors can sense the proximity of said magnetic float, and wherein said sensors are not permanently affixed directly to said container so that said container is removable for refilling without decoupling said sensors from said container.

6. The remote monitoring system of claim 5, further comprising a container mount for securing said container thereto and selectively releasing said container for removal.

7. The remote monitoring system of claim 1, wherein said controller is configured or programmed to count hits received from a particular one of said sensors, and to send said output signal to said indicator until said controller receives a predetermined number of hits from another one of said sensors.

8. The remote monitoring system of claim 7 wherein said controller is configured or programmed to reset said hit count to zero after a predetermined period of time, after said controller receives a predetermined number of canceling hits from one of said sensors, or both.

9. A machine for use with a removable and replaceable liquid container having a magnetic float disposed therein, said machine comprising:
    a machine frame;
    a mount for securing said container to said machine frame and selectively releasing said container for removal;
    one or more magnetic proximity sensors disposed on or adjacent to said mount, wherein said sensors are disposed at least close enough to said container that said sensors can sense the proximity of said magnetic float, and wherein said sensors are not affixed directly to said container so that said container is removable for refilling without decoupling said sensors from said container;
    an indicator mounted to said machine frame at a position remote from said mount and having one or more liquid level indicators each corresponding to one of said sensors; and
    a controller for receiving one or more input signals from each said sensor when said float moves laterally into proximity with said sensor in response to movement of said container, and communicating one or more output signals to said corresponding level indicator, wherein said level indicators indicate said level of said liquid within said container.

10. The machine of claim 9, wherein said magnetic float comprises an elongate body that is buoyant in said liquid and that has at least two portions comprising a magnetic material, wherein one of said magnetic portions is positioned at an end of said elongate body and configured in an axial orientation and another of said magnetic portions is positioned at a side of said elongate body and configured in a radial orientation generally perpendicular to said axial magnet, and wherein said sensors sense said float when said float drifts laterally into proximity with said sensors.

11. The machine of claim 9, wherein said sensors are disposed adjacent to said container in positions corresponding to container liquid levels selected from the group consisting of full, ¾ full, ½ full, ¼ full, and empty.

12. The machine of claim 9, further comprising a sensor mounting member, wherein each of said sensors is coupled to said mounting member.

13. The machine of claim 9, wherein said controller is configured or programmed to send said output signal to said corresponding level indicator for a predetermined period of time.

14. The machine of claim 9, wherein said controller is configured or programmed to count hits received from a particular one of said sensors, and to send said output signal to said indicator until said controller receives a predetermined number of hits from another one of said sensors.

15. The machine of claim 14, wherein said controller is configured or programmed to rest said hit count to zero after a predetermined period of time, after said controller receives a predetermined number of cancelling hits from one of said sensors, or both.

16. A method for retrofitting a pre-existing liquid level indicator on a vehicle to provide for remote liquid level monitoring, said method comprising:

providing one or more magnetic proximity sensors;

mounting said sensors to said vehicle;

providing a liquid container;

providing at least one magnetic float;

inserting said float into said container so that said float is not constrained from lateral movement and moves laterally into and out of proximity with the sensors in response to movement of said container when mounted to said vehicle;

mounting said container to said vehicle;

providing at least one controller configured for receiving input signals from said sensors and transmitting output signals to said pre-existing indicator;

mounting said controller to said vehicle;

connecting said sensors to said controller; and connecting said controller to said pre-existing indicator.

17. The retrofit method of claim 16, wherein said pre-existing indicator comprises resistance characteristics, and further comprising the act of providing said controller with resistance characteristics to correspond to said resistance characteristics of said pre-existing indicator.

18. The retrofit method of claim 16, wherein said vehicle is a forklift having a container mount for securing said container thereto and selectively releasing said container for removal.

19. The retrofit method of claim 16, wherein said pre-existing indicator comprises a control wire connected to a pre-existing fuel tank, and wherein said act of connecting said controller to said pre-existing indicator comprises the acts of severing said control wire between said pre-existing indicator and said pre-existing fuel tank and connecting said control wire from said pre-existing indicator to said controller.

20. The retrofit method of claim 16, wherein said act of inserting said float into said container comprises the acts of removing a plug or valve from an opening in said container, dropping said magnetic float though said opening into said container, and replacing said plug or valve in said opening.

21. The retrofit method of claim 16, wherein said act of mounting said container to said vehicle comprises mounting said container adjacent but not coupled to said sensors so that said container is removable for refilling without decoupling said sensors from said container.

22. A container for a liquid, said container for use with a remote liquid level monitoring system having one or more magnetic proximity sensors, said liquid container comprising:

a shell bounding a contained volume;

at least one opening defined in said shell and communicating with said contained volume, wherein said liquid can be added or removed from said container through said opening; and a magnetic float disposed within said contained volume without being constrained from lateral movement and sized sufficiently small relative to said contained volume that it moves laterally in response to movement of said shell, wherein said magnetic float comprises an elongate body that is buoyant in said liquid, wherein said elongate body has at least two portions comprising a magnetic material with one of said magnetic portions positioned at an end of said elongate body and configured in an axial direction and another of said magnetic portions positioned at a side of said elongate body and configured in a radial direction, where said magnetic portions are sensible by said sensors.

23. The float of claim 22, wherein said container is generally cylindrical with two ends and an arcuate side, is disposed on said side so that said liquid has a larger surface area when said container tank is half full than when almost full or almost empty.

24. The float of claim 22, wherein said float body is generally cylindrical.

25. A magnetic float for use within a container for a liquid, said container for use with a remote liquid level monitoring system having one or more magnetic proximity sensors, said float comprising:

a body that is buoyant in said liquid and that has at least two portions comprising a magnetic material;

wherein said float body is elongate and one of said magnetic portions is positioned at an end of said elongate body and configured in an axial orientation and another of said magnetic portions is positioned at a side of said elongate body and configured in a radial orientation generally perpendicular to said axial magnet; and wherein said float body is sized sufficiently small relative to said container that the body is not constrained from lateral movement within the container and moves laterally in response to movement of said container, wherein said magnetic float is sensible by said sensors.

26. The float of claim 25, wherein said float comprises two or more materials, wherein one of said materials is selected for buoyancy and said other material is magnetic.

27. The float of claim 25, wherein said float body is generally cylindrical.

28. A container for a liquid, said container for use with a remote liquid level monitoring system having one or more magnetic proximity sensors, said liquid container comprising:

a shell bounding a contained volume;

at least one opening defined in said shell and communicating with said contained volume, wherein said liquid can be added or removed from said container through said opening; and a magnetic float disposed within said contained volume without being constrained from lateral movement and sized sufficiently small relative to said contained volume that it moves laterally into and out of proximity with the sensors in response to movement of said shell, wherein said magnetic float is sensible by said sensors only when said magnetic float is in proximity with said sensors.

29. The container of claim 28, wherein said float is sized and shaped so that it can be inserted into said container through said opening.

30. The container of claim 29, wherein said float comprises an elongate body that is buoyant in said liquid, at least two portions of said body comprising a magnetic material with one of said magnetic portions positioned at an end of said elongate body and configured in an axial direction and another of said magnetic portions positioned at a side of said elongate body and configured in a radial direction.

31. A controller for use in a system for remotely monitoring a liquid level, said system comprising a container for said liquid, a float within said container, one or more proximity sensors adjacent said container, and a indicator, said controller comprising:

a computer processor configured for communication with said proximity sensors and said indicator;

wherein said processor is programmed to receive one or more input hit signals corresponding to a particular one of said sensors in response to said float drifting laterally into proximity with said particular sensor, to count said input hit signals, and to send an output signal corresponding to said particular sensor to said indicator to indicate said level of said liquid in said container.

32. The controller of claim 31, wherein said processor is further programmed to continue sending said output signal corresponding to said particular sensor to said indicator until said controller receives a predetermined number of input hit-canceling signals corresponding to another of said sensors in response to said float dropping or raising with said liquid level and drifting laterally into proximity with said other sensor.

33. The controller of claim 32, wherein said processor is further programmed to reset to a zero count after said controller receives said predetermined number of input hit-canceling signals from said other sensor, after a predetermined period of time, or after both.

34. The controller of claim 32, wherein said processor is further programmed to reset to a zero count after said controller receives said predetermined number of input hit-canceling signals from said other sensor, and wherein said predetermined number of input hit-canceling signals is greater when said particular sensor is a lowest one of said sensors than when said particular sensor is a higher one of said sensors.

35. The controller of claim 31, wherein said processor is further programmed to, when said output signal corresponds to a lower one of said sensors, and after receiving a predetermined number of input hit signals corresponding to a highest one of said sensors, send an output signal corresponding to said highest sensor to said indicator, to indicate that said container has been refilled with liquid.

36. The controller of claim 31, wherein said processor is further programmed to count multiple input hit signals received within a predetermined period of time as a single input hit signal.

37. The controller of claim 31, wherein said processor is further programmed to, when said output signal corresponds to said particular sensor and a next input hit signal corresponds to one of said sensors below said particular sensor, count said next input hit signal as if it corresponds to one of said sensors immediately above said particular sensor.

38. The controller of claim 31, wherein said processor is further programmed to send said output signal corresponding to said particular sensor to said indicator for a predetermined period of time, and to send an output signal corresponding to a next lower sensor to said indicator after said predetermined period of time if a predetermined number of input hit signals corresponding to next lower one of said sensors has been received by said controller.

39. The controller of claim 31, wherein said processor is further programmed with a start-up default mode during which the controller sends a pulsing output signal to said indicator until said controller receives said input hit signal corresponding to said particular sensor.

40. The controller of claim 31 in combination with said monitoring system, wherein said float of said monitoring system is disposed within said container so that said float is not constrained from lateral movement and moves laterally into and out of proximity with said sensors in response to movement of said container, said float is sensible by said sensors only when said float is in proximity with said sensors, and said input hit signals are sent from said sensors to said controller when said float comes into proximity with said sensors.

* * * * *